United States Patent [19]

Huang et al.

[11] Patent Number: 4,869,361

[45] Date of Patent: Sep. 26, 1989

[54] COLLECTING DEVICE FOR POLYETHYLENE-SHEET CALENDAR MANUFACTURING MACHINE

[76] Inventors: Ming Y. Huang, No. 63, Ta Hsin St.; Jau N. You, Feng Chai Rd., both of Tainan, Taiwan

[21] Appl. No.: 251,779

[22] Filed: Oct. 3, 1988

[51] Int. Cl.[4] .............................................. B65G 17/36

[52] U.S. Cl. .................................... 198/711; 271/294; 198/797

[58] Field of Search ..................... 198/797, 711, 860.3, 198/840, 841, 842; 271/292, 294

[56] References Cited

U.S. PATENT DOCUMENTS

| | | | |
|---|---|---|---|
| 320,897 | 6/1885 | Thomas | 198/711 |
| 3,578,143 | 5/1971 | Woodward | 271/294 X |
| 4,015,484 | 4/1977 | Taylor | 198/842 X |
| 4,055,339 | 10/1977 | Looney | 271/294 X |

FOREIGN PATENT DOCUMENTS

| | | | |
|---|---|---|---|
| 0002155 | 1/1983 | Japan | 271/294 |
| 0047710 | 3/1983 | Japan | 198/711 |

*Primary Examiner*—Robert J. Spar
*Assistant Examiner*—James R. Bidwell
*Attorney, Agent, or Firm*—Morton J. Rosenberg; David I. Klein

[57] ABSTRACT

A collecting device for polyethylene-sheet calendar manufacturing machines including a supporting plate having horizontal upper and lower plates, a pair of rollers disposed adjacent to the supporting plate, a belt disposed on and driven by the rollers and a plurality of receiving devices engaged on the belt and supported by the supporting plate. Each receiving devices has a fixing piece secured on the belt and a receiving box engaged with the fixing piece by a bearing, so that the opening of the receiving box faces upwards during operation.

1 Claim, 5 Drawing Sheets

COLLECTING DEVICE FOR POLYETHYLENE-SHEET CALENDAR MANUFACTURING MACHINE

BACKGROUND OF THE INVENTION

Everyday, pull-away or tear-away calendar pages must be torn off and thrown away. It has been found that it is practical for each page of calendar to be formed as a bag. That is, after detachment, the pages of the calendar can be used for containing garbage. Further, each page of calendar is made of double-layer polyethylene-sheet and the date is printed thereon. Manufacturing the pages of calendar is quite similar to manufacturing conventional double-layer polyethylene-sheet bags. It has been previously disclosed that a printing device may be combined with a conventional machine which manufactures double-layer polyethylene-sheet bags. The bags or pages of calendar are manufactured automatically by the proper machine, but collected manually. Since the bag is a soft and light material, it is difficult to collect a great number of the bags at one time.

SUMMARY OF THE INVENTION

It is the purpose of this present invention, therefore, to mitigate and/or obviate the abovementioned drawbacks in the manner set forth in the detailed description of the preferred embodiment.

It is a primary objective of the present invention to provide a collecting device for polyethylene-sheet calendar manufacturing machine in order to collect the pages of calendar automatically.

It is the further ojective of the present invention to provide a collecting device for polyethylene-sheet calendar manufacturing machine which comprises a belt engaged with several receiving means to receive the pages f the calendar.

Further objectives and advantages of the present invention will become apparent as the following description proceeds, and the features of novelty which characterize the invention are pointed out with particularity in the claims annexed to and forming a part of this invention.

DESCRIPTION OF THE PREFERRED EMBODIMENT

Figure 1:
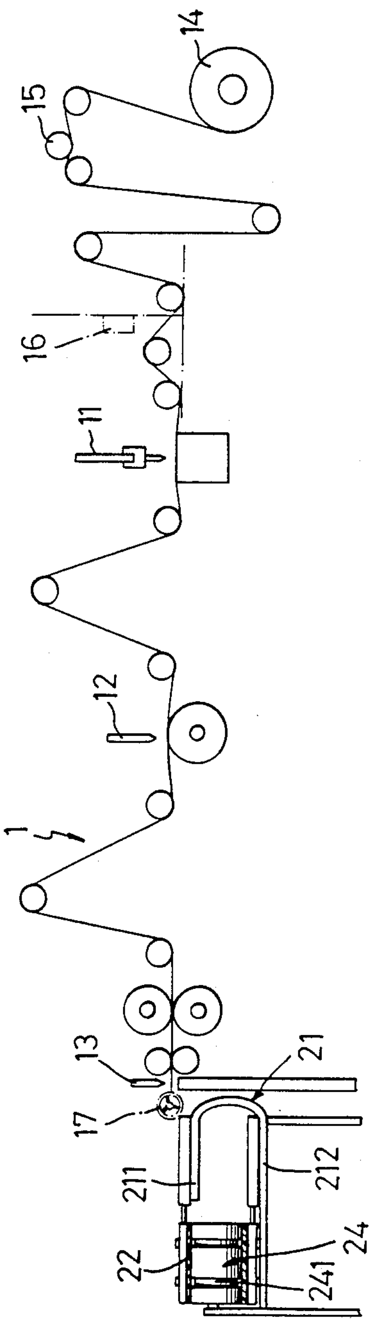
FIG. 1 is a schematic view of polyethylene-sheet calendar manufacturing machine showing the orientation of the collecting device with respect to the machine.

Referring to FIG. 1, a double-layer polyethylene-sheet bag manufacturing machine is designated by numeral 1. The bag manufacturing machine 1 comprises a supplying roller 14 to supply polyethylene-sheet, a plurality of rollers 15 to transfer the polyethylene sheet, an electric eye 16, a pressing mold 11, a sealing mold 12 and a cutting mold 13 to form the bags, and an adjusting means 17 to tidy the bags. However, the above-mentioned construction is quite similar to the prior art. The main feature of the present invention is a collecting device 2 to receive the formed bags from the manufacturing machine.

Figure 2:
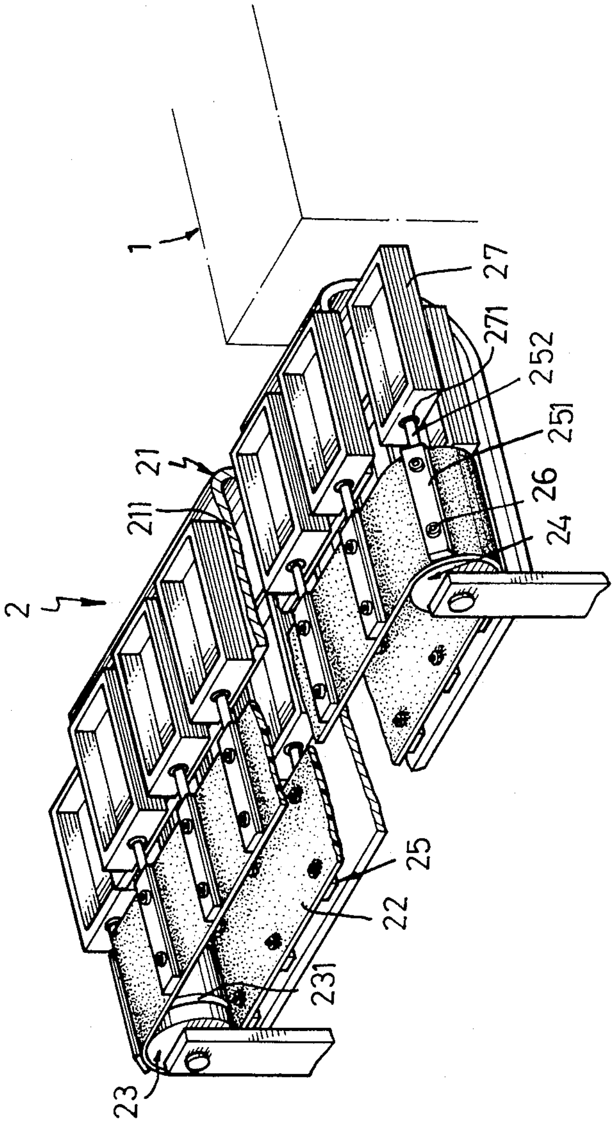
FIG. 2 is a perspective view of a collecting device in accordance with the present invention.
Figure 3:
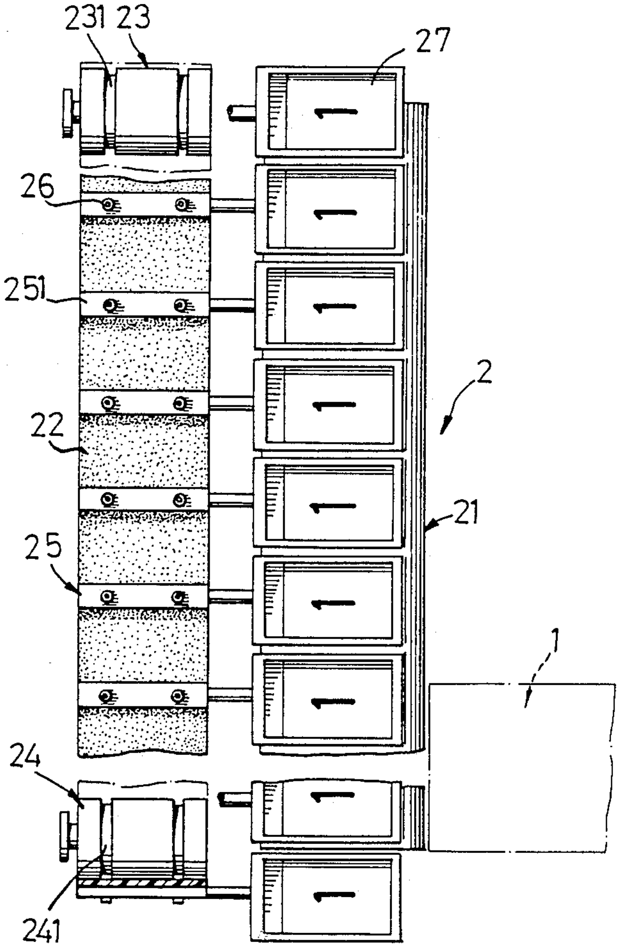
FIG. 3 is a top view of the collecting device of FIG. 2.

Referring to FIGS. 2 and 3, it can be seen that the collecting device 2 comprises a supporting plate 21 comprising horizontal upper and lower plates 211 and 212, a belt 22 supported by a pair of rollers, 23 and 24, a plurality of receiving means 25 disposed on the belt 22 and supporting plate 21. Each of the receiving means 25 comprises a fixing piece 251 secured on the belt 22 by a pair of screws 26. The outer end of each fixing piece 251 is formed as a cylindrical rod 252. Each receiving means 25 further comprises a receiving box 27 which has a bearing 271 at its inner end to allow the cylindrical rod 252 to rotate therein. The receiving box 27 is supported on the upper surface of the upper plate 211 or lower plate 212 of the supporting plate 21.

The rollers 23 and 24 drive the belt 22 to rotate. The belt 22 drives the receiving boxes 27 to slide along the upper surface of upper or lower plate 211, 212. The distance between the rollers 23 and 24 is greater than the length of the supporting plate 21, so that the receiving boxes 27 are moved along the upper surface of upper plate 211 and then moved along the upper surface of lower plate 212 to complete a cycle. Further, since a bearing 271 is disposed at the inner end of each receiving box 27, the opening of the receiving box 27 is maintained in an upward orientation while moving along upper plate 211 or lower plate 212 or therebetween.

Further, referring to FIG. 3, two sets of two grooves 231 and 241 are disposed on each of the rollers 23 and 24. Since there are two screws 26 used for securing each fixing piece 251 onto the belt 22, the grooves 231 and 241 allow the respective heads of the screws 26 to pass through.

Figure 4:
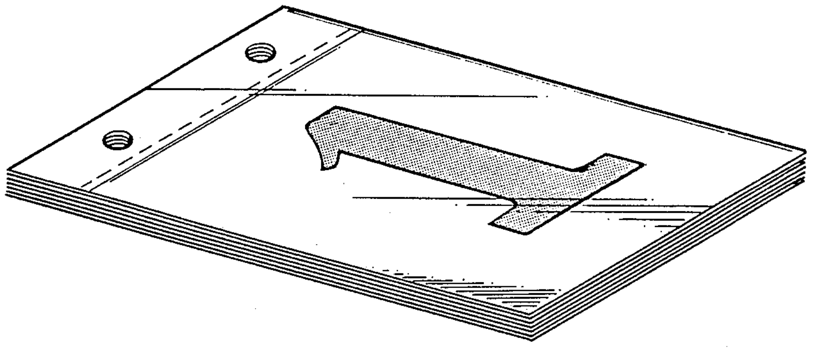
FIG. 4 is a perspective view of a polyethylene-sheet calendar after arrangement by the collecting device of FIG. 2.
Figure 5:
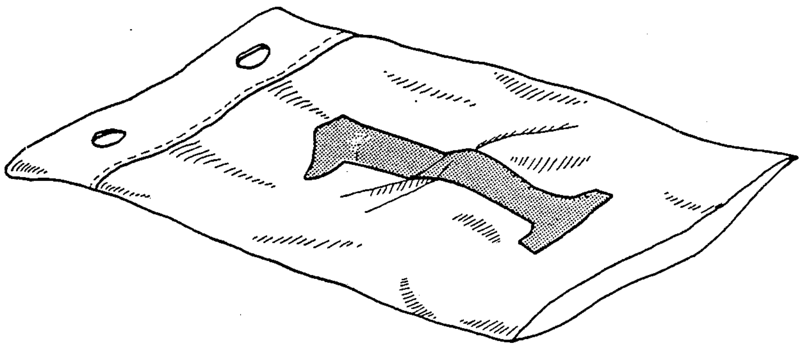
FIG. 5 shows a calendar page in accordance with the present invention after detachment from the calendar.
Figure 6:
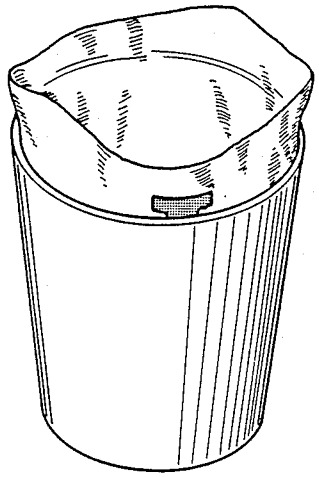
FIG. 6 shows a calendar page after detachment being used as a bag for containing garbage.

When the calendar page on which a data number has been printed is transmitted from the manufacturing machine 1, a receiving box 27 receives the page and then continues to slide away. The next page is received by an adjacent (following) receiving box 27. For example, if there are fifty receiving boxes 27 arranged within the collecting device 2, the manufacturing machine 1 will provide fifty sheets of pages showing the same date, and then provide another fifty sheets of pages with the following date, as shown in FIG. 3. Every date of a year being provided, each receiving box 271 would collect a complete calendar, as seen in FIG. 4. In the above-mentioned example, the collecting device 2 would collect fifty calendars. And then, the calendar can be packaged for use. Each calendar page can be used as a bag for containing garbage when it is torn off, as shown in FIGS. 5 and 6.

While the invention has been particularly shown and described with reference to the foregoing preferred embodiment, it will be understood by those skilled in the art that other changes in form and detail may be made therein without departing from the spirit and scope of the invention as defined in the claim.

I claim:

1. A collecting device for polyethylene-sheet calendar manufacturing machines comprising:

a supporting plate comprising an upper and a lower plate horizontally disposed thereon;

a pair of rollers disposed adjacent to said supporting plate, each of said rollers having two grooves on an outer surface thereof, a distance between said rollers being greater than a length of said supporting plate;

a belt disposed on and driven by said rollers; and a plurality of receiving means engaged on said belt and supported by said supporting plate, each of said receiving means comprising:

a fixing piece being secured on said belt by a pair of screws, respective heads of said screws being passable through said grooves of said rollers, an end of the fixing piece being formed as a cylindrical rod; and a receiving box having a bearing disposed at an end adjacent to said fixing piece to engage with said cylindrical rod, so that an opening of said receiving box continuously faces upward in operation.

* * * * *